INVENTORS:
HENRY W. MOSER
ALONZO RICHARDSON
BY Howson & Howson
ATTYS.

Nov. 9, 1965   H. W. MOSER ETAL   3,216,268
APPARATUS FOR ADJUSTING THE SPEED OUTPUT OF
A REEVES TYPE TRANSMISSION
Filed May 24, 1963    4 Sheets-Sheet 4

INVENTORS:
HENRY W. MOSER
ALONZO RICHARDSON
BY Howson & Howson
ATTYS.

United States Patent Office 3,216,268
Patented Nov. 9, 1965

3,216,268
APPARATUS FOR ADJUSTING THE SPEED OUTPUT OF A REEVES TYPE TRANSMISSION
Henry W. Moser, Haddonfield, N.J., and Alonzo Richardson, Burlingame, Calif., assignors to Samuel M. Langston Company, Camden, N.J., a corporation of New Jersey
Filed May 24, 1963, Ser. No. 283,076
12 Claims. (Cl. 74—230.17)

This invention relates to apparatus for adjusting the speed output of a Reeves type transmission, especially as applied to sheet or web cutting rotary shears, and has for an object the provision of improvements in this art.

As is well known, a Reeves type drive comprises split cone pulleys with separable parts slidable on parallel shafts with a belt connection between pulleys, the cone pulley disk parts on one shaft separating as the cone pulley disk parts on the other shaft converge and vice versa so that the belt between pulleys is always kept tight and operative for driving one pulley from the other.

The shift of the pulley cone disk members on the parallel shafts is conjoint and opposite and one well known means for shifting the parts comprises a pair of levers pivoted on parallel transverse axes between the parallel shafts, the levers at one end being moved equally and oppositely, as by a screw shaft with oppositely turning threads cooperating with pivoted threaded nuts carried by the levers.

However, with a Reeves type drive it is very difficult to make fine adjustments and, moreover, if frequent adjustments or joggings are made over a long period of time the parts become so worn and loose that it is impossible to make or maintain fine adjustments.

According to the present invention, fine or vernier adjustment means are added to the basic Reeves drive adjusting mechanism, the vernier adjustment means being interposed in and functioning more or less independently of the main adjustment means yet permitting the main adjustment means to take over the adjustment control as freely and completely as if the auxiliary vernier adjustment means were not present.

Additionally, the invention provides means which comes into action when the main adjusting means is actuated for returning the vernier adjusting means to a neutral or zero condition so that when it again acts after a gross or major adjustment has been made it will start afresh at a zero position free from any previous setting it may have made prior to the gross adjustment.

The invention will be illustrated herein as applied to web or sheet cut-off mechanism of the rotary blade or so-called flying shear type in which the rolls carrying the knife blades turn at the same circumferential speed as the linear speed of the advancing sheet being cut during the time the blades are cutting the sheet. Obviously, this is a prerequisite to smooth operation free from buckling of the sheet. When stiff sheets are being cut, it is especially important that buckling be avoided; and more specifically, the invention will be illustrated in connection with the cutting of variable blank lengths, as for making packaging boxes, from double-faced or double-liner corrugated board. An example of apparatus for making and continuously advancing a double-faced corrugated sheet is disclosed in Patent No. 2,993,527.

The rotary cutter is located at a distance beyond or downstream from the delivery end of the board forming machine. Other machines for performing further operations are disposed in the line of the sheet cutter so that blanks are finally produced for boxes or other purposes which are of the desired width and length. Examples of apparatus for performing various operations on corrugated board blanks will be found in Patents No. 2,309,728, No. 2,764,217, and No. 2,950,658. In all of these installations a single line shaft drives all of the units in a line in properly coordinated and timed relationship from a single prime mover or motor.

The rotary cut-off or flying shear device consists essentially of a pair of geared-together rotary cylinders or rolls carrying cooperating knife blades which cut one length from the sheet as it advances continuously between the rolls each time the rolls make one revolution together.

Now, since the cutting rolls turn at the same speed as the travel speed of the sheet during the actual cutting time and since blanks of a wide range of lengths are to be cut for various purposes from the sheet which advances at constant speed, it will be evident that the cutting rolls must move at varying speeds during that part of each revolution or off time when they are not cutting with the knife blades moving in unison with the sheet. If the blanks are short the cutting rolls in the non-cutting or off arc must travel relatively fast; and if the blanks are long the cutting rolls in the non-cutting or off arc must travel relatively slowly. Rotary cut-off machines of this nature are disclosed in Patents No. 2,262,913 and No. 3,003,380.

There are many variables which make it difficult to change from one length of cut to another by pre-setting so it is customary to make adjustments while running, called "zeroing in," after each change in length for a different lot or order of blanks. There are also conditions which arise which make it difficult to maintain a given length, even when initially stabilized, except by further adjustments.

In the past considerable tolerance in blank length was accepted; it is now becoming more usual to require much greater precision in blank length. Also it is becoming more usual to pre-print the blanks in the uncut sheet and in this case the Reeves setting has to be quite accurate in order that the printed register control will maintain the printing in a proper and uniform position on the boxes which are formed from the blanks.

Apparatus has heretofore been provided which will operate to the required precision but of a more refined, elaborate, and expensive character than that which can be afforded by many users. Apparatus of a simple yet dependable character is provided hereby.

The objects of the invention as well as various features of novelty and advantages will be apparent from the following description of an exemplary embodiment, reference being made to the accompanying drawings wherein.

Figure 1:
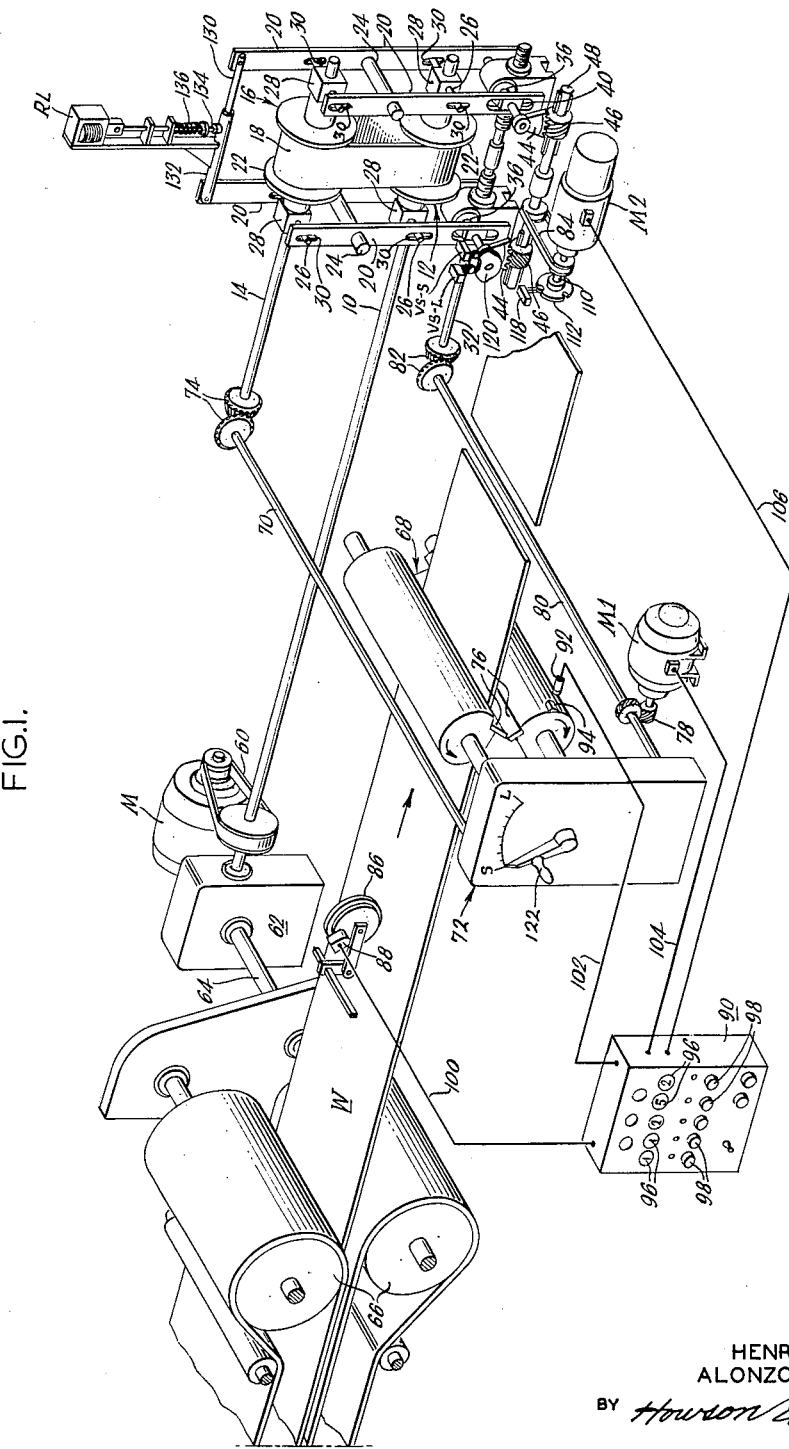
FIG. 1 is a perspective view of part of a board forming and cutting plant which includes a modified Reeves type drive embodying the invention.
Figure 2:
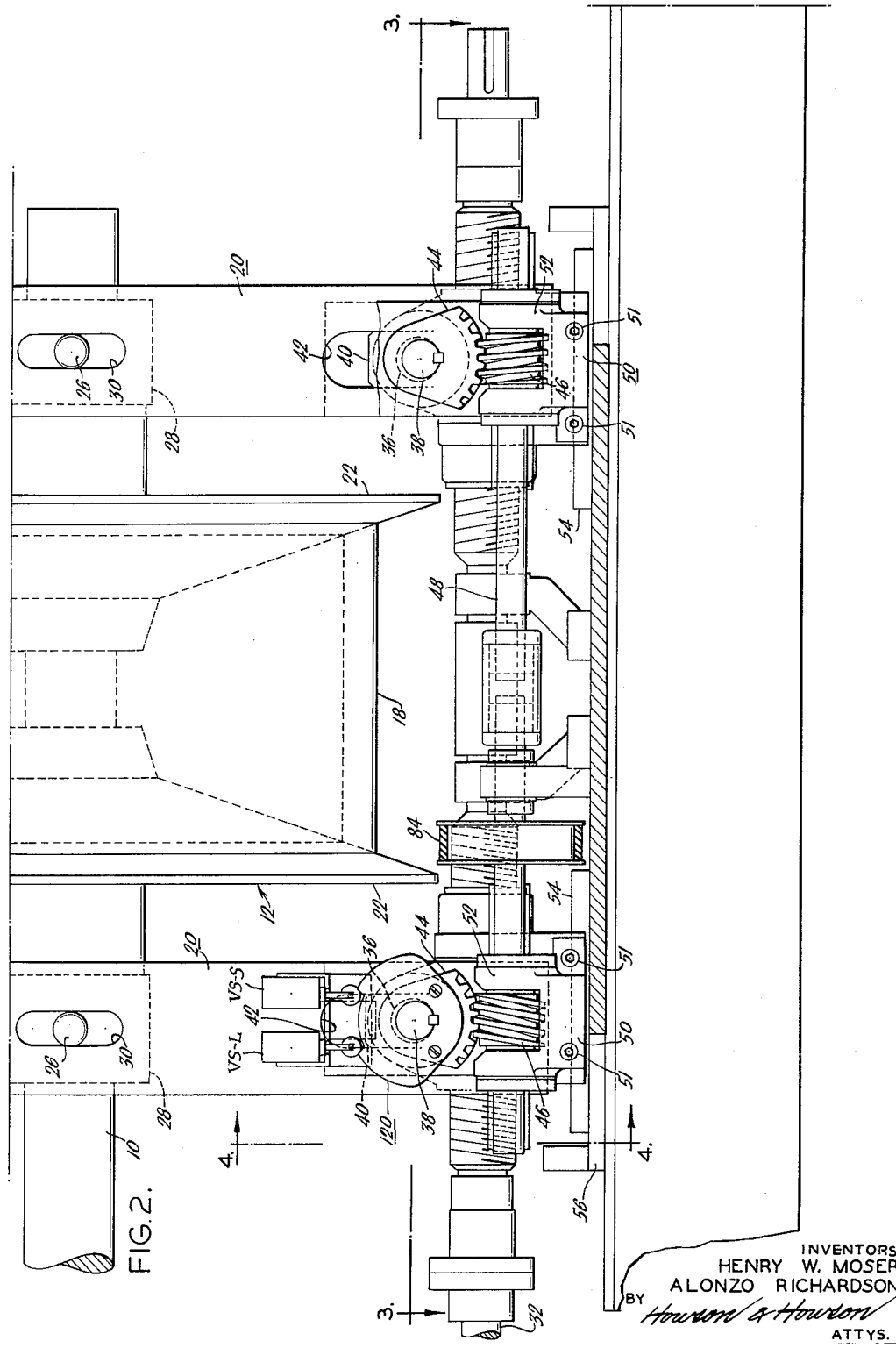
FIG. 2 is an enlarged elevation of the lower portion of the improved Reeves drive.
Figure 3:
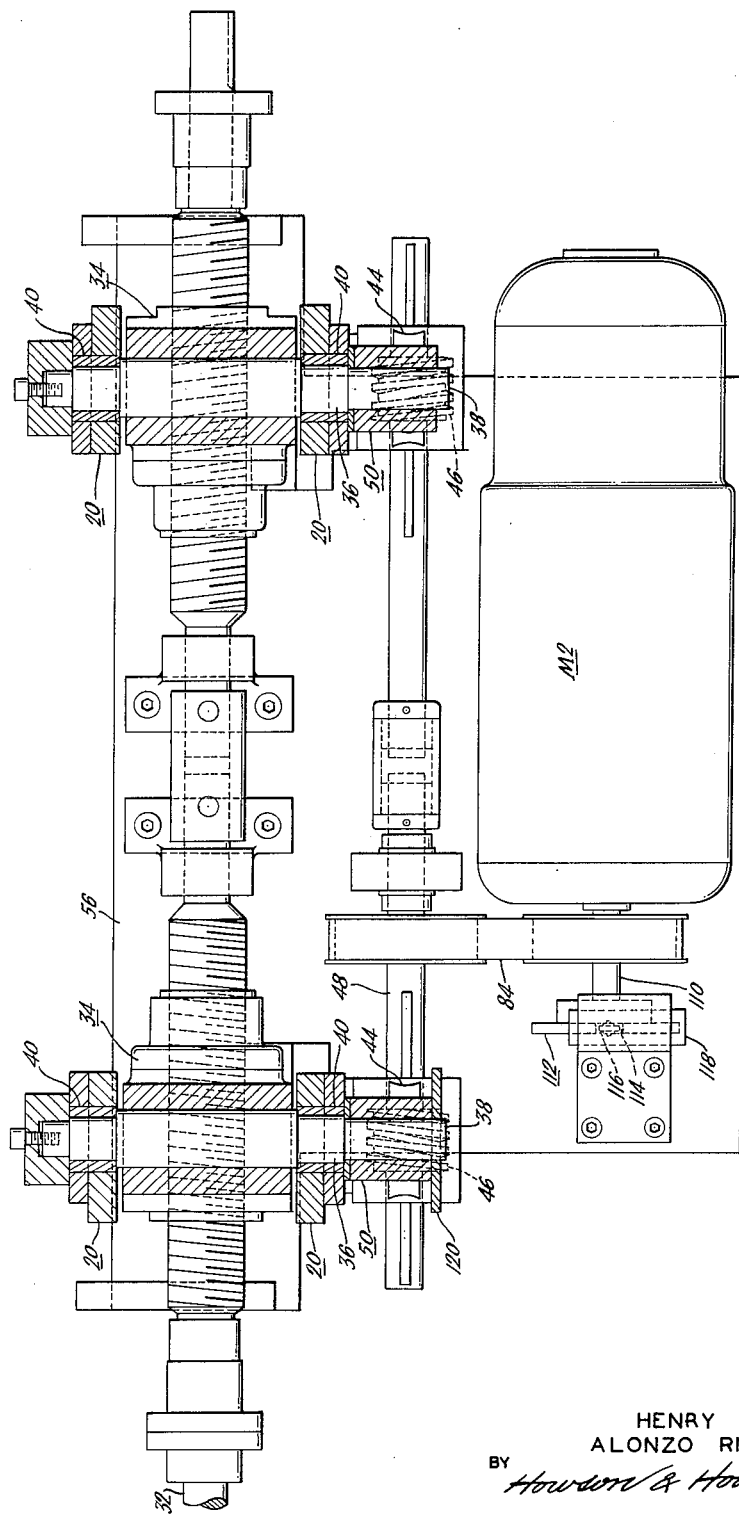
FIG. 3 is a horizontal section taken on the line 3—3 of FIG. 2.
Figure 4:
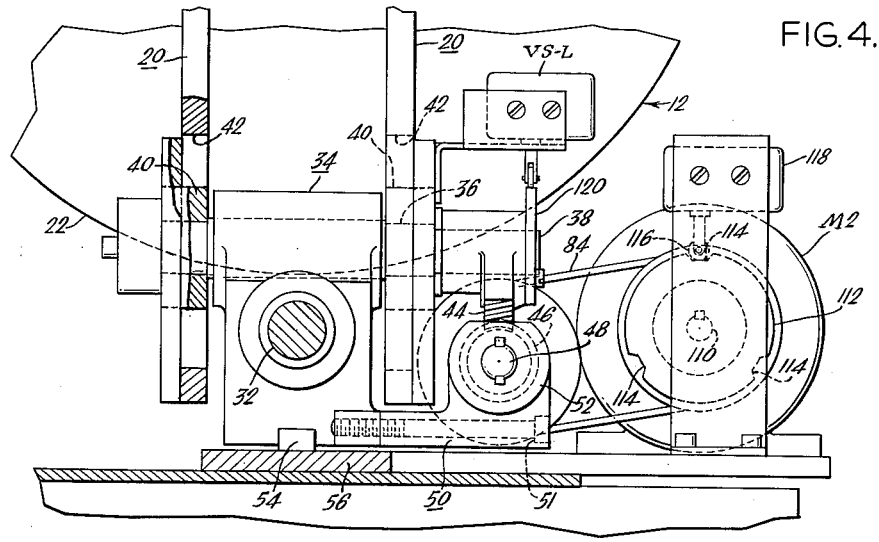
FIG. 4 is a vertical transverse section taken on the line 4—4 of FIG. 2.

The improved Reeves type drive mechanism with which the present invention is particularly concerned is shown at the right-hand side of FIG. 1 and in FIGS. 2 to 4. Much of the supporting framework has been omitted in order to more clearly show the operating parts.

The basic Reeves drive is maintained without much change, the improved vernier adjustment means being added to or "grafted on" the basic drive mechanism. It comprises a driving shaft 10 with a split pulley 12 thereon, a driven shaft 14 with a split pulley 16 thereon, a drive belt 18 on the pulleys, and adjusting levers 20 for shifting the axially movable conical pulley disk parts 22 conjointly in and out in well-known manner to make speed adjustments.

The levers 20 are mounted on parallel transverse pivot pins 24 located midway between the axes of the parallel shafts 10 and 14 and are connected to the conical pulleys parts 22 by pivot pins 26 carried by blocks 28 secured to the pulley parts and operating in slots 30 of the arms 20.

The levers 20 are adjusted for large or gross changes by a gross adjustment screw shaft 32 having right and left hand threaded parts turnably operating in pillow block nuts 34 having pivot pins 36. In the usual Reeves drive mechanism the pivot pins 36 would be directly mounted in slots in the levers 20 but according to the present invention the arrangement is changed. The pivot pins 36 here are turnably mounted in bearings in the nuts 34 at one side of the screw shaft 32, here above.

On their ends the pivot pins 36 carry eccentric pins 38 which are turnably mounted in slide blocks 40 operating in slots 42 of the control levers 20. By this arrangement the eccentric pins 38 and the pins 36 integral therewith can be turned independently of any movement of the screw shaft 32 to provide fine adjustment of the levers 20.

Each front end eccentric pin 38 at each end has a worm gear sector 44 secured thereon and this sector is operatively meshed with a worm 46 splined for axial movement on a vernier adjusting shaft 48 mounted in bearings in an extension member 50 which is rigidly carried by the nut member 34, here being secured thereto by bolts 51. The member 50 has upstanding projections 52 which carry the shaft bearings and also confine the worm 46 at its ends so as to cause the worm to move bodily with the member 50 and the nut member 34 which carries it so that when gross adjustments are made by rotation of the main adjustment shaft 32 the two worms 46 are carried bodily with the nut members, sliding along the vernier adjustment screw shaft 48 in opposite directions without turning. The threads on the worms 46 are oppositely formed so as to turn the worm gear sectors 44 in opposite directions and through the eccentric pins 38 and blocks 40 carried thereby to move the ends of the levers 20 in opposite directions. This is done without moving the main adjustment nut members 34 at all, instead these nut members serving as temporarily fixed reaction elements relative to which the vernier adjustments are effected. The nut members 34 are stabilized against turning as they move back and forth by being guided along close fitting rails 54 of a supporting base 56.

Both the main adjusting screw shaft 32 and the vernier adjusting screw shaft 48 could be turned by hand if desired but as herein shown they are turned by controlled power means.

The main machinery drive is by a motor M; the main or gross Reeves transmission adjustment drive is by a motor M1; and the vernier adjustment drive is by a motor M2.

The motor M drives the line shaft 10 through a belt 60 and the shaft 10 drives mechanism within a gear box 62 to drive the power shaft 64 of the delivery rolls 66 for the board sheet or web W which is to be cut by the rotary cutting device or flying shears 68. The rolls of the cutting device 68 are driven from the output shaft 14 of the Reeves drive device through a shaft 70 and a cyclic control mechanism 72 of known type (see Patents 2,262-913 and 3,003,380) which places the average velocity under the Reeves transmission, with the cyclic mechanism causing the roll knives to move at web speed during the cutting time. Bevel gears 74 connect the shafts 14 and 70. In FIG. 1 the knife blades 76 are shown in the position they occupy just after a cut has been made.

The motor M1, through worm gearing 78, drives a shaft 80 which, through bevel gears 82, drives the main or gross screw adjustment shaft 32 of the Reeves transmission.

The motor M2, through a belt 84, drives the vernier adjustment shaft 48.

Other items to be noted in FIG. 1 are a measuring wheel 86 which rolls without slippage on the emerging board W, a signal impulse output device 88 which can indicate board lengths in very small increments of length, say hundredths of an inch, a comparator computer device 90 of a known type, as for example, one known as an IMAC console which is made by Industrial Measurement and Control Corp. which acts as a sheet length monitor, and a shear signal device 92 which may be in the form of a conventional magnetic reluctance pick-up device which is activated by the passing of a projection 94 on one of the cut-off rolls, say at the point in passing where the cut has been completed.

The console 90 has a line of length registering lamps 96 which show lengths in numbers and a line of hand dials 98 which can be set for the length desired. As an example, the length set may be 112.52" and that is the length displayed on the lamps in FIG. 1, a cut having just been made. The connecting line from the length signaling device 88 to the console is indicated by the numeral 100; that from the shear signal device 92 to the console is indicated by the numeral 102; the output line from the console to gross adjustment motor M1 is indicated by the numeral 104; and the output line from the console to the vernier adjustment motor M2 is indicated by the numeral 106.

A shear signal impulse from the shear signal impulse device 92 is transmitted to and through a bi-stable multivibrator, commonly called a flip-flop switch, located in the console 90. In this way the circuit to the electronic counter in the IMAC unit 90 is open during one revolution of the cutting rolls 68 so that the counter shows the count and is reset to zero and closed during the next revolution so that the counter can count or measure the traversing sheet, whose length will be shown or displayed next.

The electronic counter in the IMAC unit indicates the number of impulses sent to this unit by the pulse generator of the counting wheel (100 per inch) during one revolution of the cutting roll in which the circuit to the counter is kept closed by the shear signal 92.

The number of impulses sent by the pulse generator 88 during one revolution of the cutting rolls will be flashed through the light windows or numeral indicating lamps 96 of the IMAC unit during the next revolution of the cutting rolls.

The desired length of box blank to be cut off for each revolution of the cutting rolls is set up on the dials 98.

The unit is so designed that the measuring wheel and pulse generator will measure the number of impulses that are made in the length of the blank advancing through the cutting rolls prior to severance by the cutting rolls. This number of impulses will correspond to the actual length of blank cut off and this length will be displayed in the row of lamps 96 during the next revolution of the cutting rolls.

During the revolution of the cutting rolls in which the blank length is measured, the lamps 96 are not lighted. During the next revolution of the cutting rolls the lamps 96 are lighted to indicate the length of blank which has just been cut off; and if the length measured during the previous measuring revolution does not correspond to the dialed length set up at 98, the IMAC unit closes the circuit to the vernier adjusting motor M2 which results in an incremental adjustment in the cut length. The console unit determines by the comparison which it makes whether the length is to be increased or decreased and since the motors M1 and M2 for making corrections are reversible the correction will be made in the proper sense or direction.

It is arranged that when the motor M2 turns the vernier adjustment shaft 48 a predetermined amount the motor will be stopped. Here the drive from motor shaft to the adjustment shaft 48 through the belt 84 is 1 to 1 so for convenience the increment controlling means is associated with the motor shaft 110. Furthermore, while any desired increment may be established it is here arranged that the motor M2 will be stopped after it makes one-third of a revolution. Accordingly, a stop disk 112 is secured on the motor shaft 110 and the disk 112 is provided with three equally spaced notches 114 which are engaged by the cam follower roller 116 of a stop switch 118. There is no need to show the circuit since the starting action compares to the pressing of a push button switch in parallel or shunt with the switch 118, the motor action closing the switch 118 to continue the motor action until a notch 114 opens the switch. There is thus an incremental length correction for each blank cut until the correct length is obtained.

Because of the non-linearity of the Reeves drive, the incremental adjustment made by the motor stop means for one-third revolution will not always produce the same change in length of a blank. For short blanks the change will amount to about $\frac{1}{16}''$ and for long blanks will amount to about $\frac{1}{8}''$.

The eccentric pins 38 are useful from the neutral or zero position for about 22½ degrees on either side. Beyond this the movement produced is so small and so non-linear that it is not desirable to use it. For this reason the worm gear sectors 44 are limited in arcuate extent to a size which is a small amount greater than 22½ degrees on either side of a neutral center or zero position, here 25 degrees on either side, or a total of 50 degrees arcuate extent.

The effective movement is limited to 22½ degrees on either side by a cam 120 mounted on one of the eccentric pins 38 and a pair of limit switches VS–L, VS–S cooperating therewith for right and left turning. When the cam disk 120 is turned 22½ degrees in either direction the motor M2 is stopped. If further movement in the same direction is needed the main adjustment motor M1 is caused to be operated. Since the correction increment made by M1 is of greater magnitude than those made by M2, the controls will then cause M2 to turn the disc 120 back toward neutral position.

The Reeves drive and cyclic control mechanism 72 is provided with an adjusting and length indicating quadrant lever 122 which is marked for board lengths for a gross setting and when there is a change in board lot length this adjustment for length is made by operation of motor M1 independently of the console control. During this gross setting the vernier adjustment is brought to neutral or zero position. Thereafter, when the system is returned to console monitor control, the fine adjustment is made through the measuring wheel, its impulser, the console and the vernier adjustment means in the manner described.

Whenever the motor M2 is operated to return parts to neutral or zero position the stop switch 118 for incremental adjustments is rendered incapable of stopping motor M2.

In operation, with one type of line machinery with which the present improved Reeves drive may be used is as follows:

(1) Set quadrant on Reeves drive for the blank length to be run on next order.

(2) Disconnect incremental adjustment unit from the IMAC console unit and set the new length on the dials 98 of the IMAC unit.

(3) Stop the main drive motor M to stop the board sheet travel.

(4) Cut off the board near the delivery rolls 66 by hand with known means provided on these machines.

(5) Disconnect motor M from the board forming and feeding means, including the delivery rolls 66, leaving only the advance portion of shaft 10 to be driven.

(6) Run motor M to run out the board length cut off.

(7) Operate the blank length change run button (not shown but well known).

(8) Reconnect the incremental adjustment unit with the IMAC console unit.

(9) The quadrant will then cause the motor M1 to adjust the output speed of the Reeves drive to cut blanks of approximately the correct length, in this case within 0.25".

(10) Stop the main drive motor M.

(11) Re-connect the board forming and feeding means.

(12) Re-start motor M.

The vernier adjusting unit will now automatically establish and maintain the precise cut off length of the blanks—unless the variation becomes too great for the vernier adjustment means to handle, in which case the gross adjustment motor M1 will automatically be cut in, the vernier adjusting means in the shift being returned toward neutral position. After the gross adjustment has been made the vernier adjusting unit is again activated to make fine adjustments whenever needed. Since in most operations the length variation does not get beyond the range of the vernier adjusting means it can be seen that there is almost no operation required of the gross adjusting means during normal running time. Not only does this reduce wear and inaccuracies entailed thereby but provides much more precise adjustments than could be obtained by a Reeves drive without such vernier adjusting means.

Figure 5:
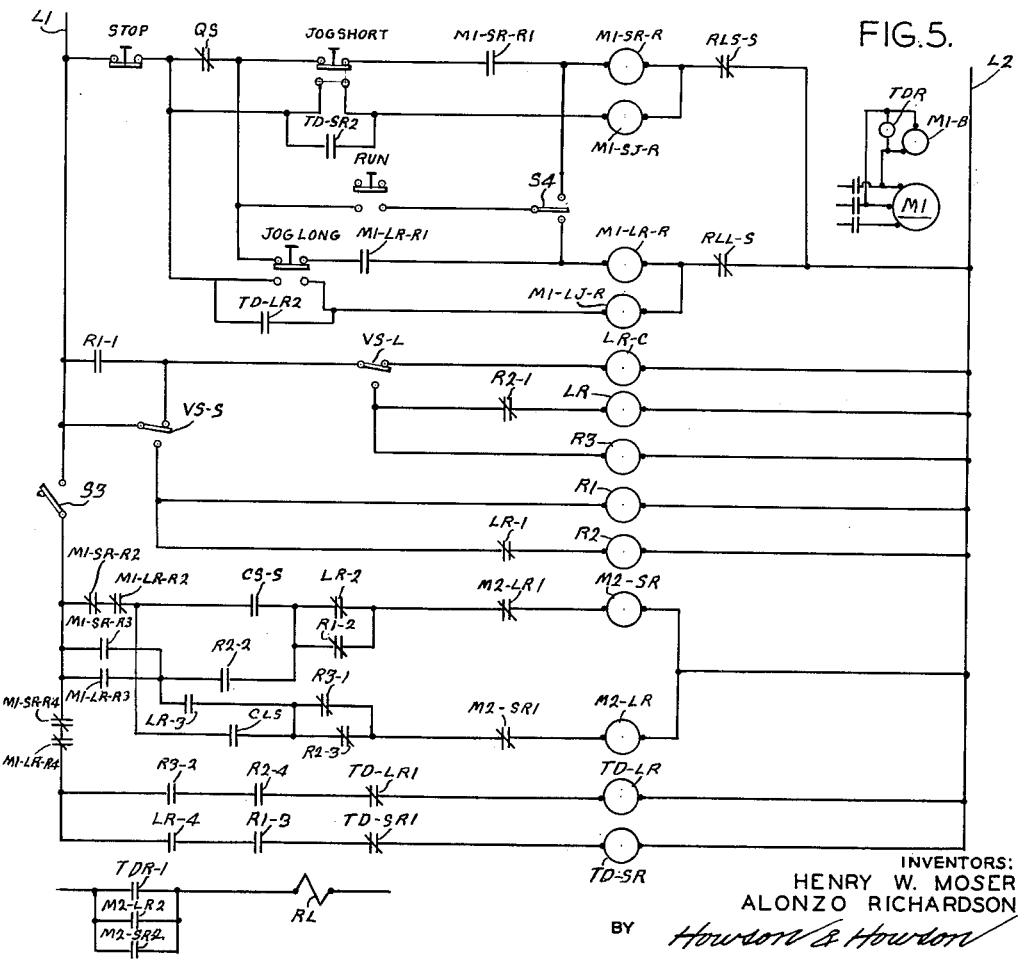
FIG. 5 is a wiring diagram, the diagram, however, including a modified increment timing control in place of the cam timing device shown in the form of FIGS. 1 to 4.

Referring to FIG. 5, which is a diagram of control circuit means for the apparatus described except for the substitution of time delay means for the incremental stop cam 112 and its switch 118, it is seen in the upper right hand corner that the gross or fast Reeves drive motor M1 is provided with a stop brake M1–B and with the brake there is associated a time delay relay TDR which has a predetermined delay in dropping out, say 10 seconds. The purpose of this time delay relay is to allow the Reeves drive parts to stabilize after a rapid or gross adjustment before being locked up in adjusted position.

The Reeves locking device is shown diagrammatically in FIG. 1 to comprise telescopic elements, such as a rod 130 and a tube 132 carried by the adjusting levers 20, which are normally locked together by a lock plunger 134 which is normally urged into locking position by a spring 136 and moved out of locking position by a "Reeves lock" release solenoid RL.

As shown at the left bottom corner of FIG. 5, the relay TDR has a normally open contact switch TDR–1 which is closed to energize the solenoid RL to release the lock 134 for free adjustment of the Reeves drive and which is opened a short time after the brake M1–B stops the motor M1 to re-lock the Reeves drive adjustment levers 20 in stabilized adjusted position, i.e. without locked-in stresses.

The Reeves lock 134 is also alternatively released and re-locked when the vernier adjustment motor M2 operates, as will be explained.

Returning to the right upper side of FIG. 5, it is seen that the Reeves drive, either at the levers 20 or in association with the telescopic members 130, 132, is provided with limit switches RLL–S and RLS–S for limiting the movement in the board lengthening (slow speed) direction or in the board shortening (high speed) direction, respectively.

Also the motor M1 is provided with starting relays M1–SR–R, M1–SJ–R, M1–LR–R and M1–LJ–R for respectively running to shorten (higher speed), jogging to shorten, running to lengthen (lower speed) and jogging to lengthen.

On the monitor console 90 (FIG. 1) and middle left of FIG. 5) there is provided a hand operated switch S3 which is opened when changes in board lot lengths are made to eliminate the automatic action of the monitor console and the vernier adjustment means. The quadrant setting lever 122 has associated with it a limit switch QS which is closed when the lever 122 is shifted more than a given limited small distance, say ½" to 1" to allow the motor-run relays M1–LR–R or M1–SR–R to be energized and when the running adjustment brings the parts within this limit the switch QS will be opened to stop the gross adjustment. The operator then reverses the hand switch S3 to allow automatic adjustments to be made under the control of the monitor console 90 and the vernier adjustment means. The gross adjustment means may also be called into action if the adjustment needed is too great to be made by the vernier adjustment means, as will be explained; but in such case only the run starting relays M1–LR–R or M1–SR–R will be operated since such automatic gross adjustments are accomplished by TD–SR2 or TD–LR2.

A hand selector switch S4 is provided for selecting the direction of running of motor M1, the operator setting this for longer or shorter boards in accordance with the setting which he made at quadrant lever 122.

Power is supplied by main lines L1, L2.

The shorten run relay M1–SR–R, when energized, locks in on its contact switch M1–SR–R1 and the lengthen run relay M1–LR–R, when energized, locks in on its contact switch M1–LR–R1 making the high speed adjustments of M1 "maintained contacts" stopping only after QS is tripped.

Coming now to the vernier adjustment means and referring to parts seen at the middle of FIG. 5, there are some general devices which assure the proper running direction and coordinated action, especially in the case of power failure or resumption of automatic monitored adjustment after a hand controlled board length change re-setting as just described. There is a latch relay LR and a mechanical latch therefor which can only be released by a latch release solenoid LR–C after the latch coil has been energized. The coil of a relay R3 is in parallel with the coils of the latch relay LR and its latch release coil LR–C. There are coils of relays R1 and R2 in parallel with the circuit of the group of coils LR, LR–C and R3. A switch LR–1 is in series with R2.

The vernier limit switch VS–L for board lengthening action in normal position is in series with the coil LR–C and when shifted is in series with LR and R3; and the vernier limit switch VS–S for board shortening action is selectively in series with the limit switch VS–L or in series with the circuit of the coils of relays R1, R2 as a group.

A normally closed contact switch R2–1 of relay R2 is in series with latch relay coil LR. A normally open contact switch R1–1 of relay R1 is provided in a line which is parallel with a line to the vernier limit switch VS–S to provide that the circuit of the coils RL and R3 will be energized when the switch VS–S is shifted to energize coils R1 and R2, provided that switch VS–L is also closed to the coils LR and R3.

Further down in FIG. 5, there are shown the controls for operating the vernier adjustment motor M2 under the supervision of the monitor 90. First there is a motor starting coil M2–SR for running the motor in the direction to shorten a board (faster Reeves drive) and a motor starting coil M2–LR for running the motor in the direction to lengthen a board (slower Reeves drive) and cross-connection contact switches M2–SR1 and M2–LR1 to assure that if one coil is energized the other will be cut out of circuit.

In series with the coil M2–SR and switch M2–LR1 there is a parallel circuit with relay contact switches R1–2 and LR–2; and beyond these in separate lines there are the switches R2–2 and CS–S, the latter being a time delay switch operated by the monitor 90 when a shorter board length is needed.

In series with the coil M2–LR and switch M2–SR1 there is a parallel circuit with relay contact switches R2–3 and R3–1; and beyond these in separate lines there are switches LR–3 and CL–S, the latter being a time delay switch operated by the monitor 90 when a longer board is needed.

The monitor switches CS–S and CL–S may be of the known capacitor-resistor (CR) timer type with time adjustment by adjustment of a resistance element. It is assumed that the timer will be set for a length change increment of from about ¹⁄₆₄" to about ¹⁄₁₆", the actual length change for a fixed time setting varying with the position of the Reeves drive and the setting of the time delay relay.

In series with the monitor switches CL–S and CS–S, there are normally closed switches M1–SR–R2 and M1–LR–R2; and in series-parallel with the switches LR–3 and R2–2, there are normally open switches M1–LR–R3 and M1–SR–R3. If either of the high speed gross adjusting starter relays M1–LR–R or M1–SR–R is energized one of the switches M1–LR–R2 or M1–SR–R2 will be opened to eliminate the action of the monitor switches CL–S and CS–S and switches M1–LR–R3 or M1–SR–R3 will be closed to cut in the switches LR–3 and R2–2.

If LR–3 is closed, due to VS–L being shifted, the vernier motor will be run reversely until switch VS–L is reclosed to its neutral or zero contact.

If R2–2 is closed, due to VS–S being shifted, the vernier motor will be run reversely until switch VS–S is closed to its neutral or zero contact.

The energization of either starter relay for the vernier adjustment motor M2 will release the Reeves lock (FIG. 1 and bottom left of FIG. 5) by energizing the release solenoid RL, the starter solenoid M2–LR closing a contact switch M2–LR2 in parallel with TDR–1 and starter solenoid M2–SR closing a contact switch M2–SR2 in parallel with TDR–1 and M2–LR2.

Below the run circuit for the vernier adjustment motor M2 in FIG. 5, there is shown a circuit for procuring the operation of the gross adjustment motor M1 whenever the vernier adjusting means has reached the limit of its range, say about ½" to 1" of board length.

This is provided by off-delay relays TD–SR and TD–LR in parallel circuits subject to energization only if the gross adjustment motor is not in a run by M1–LR–R or M1–SR–R, there being normally closed switches M1–LR–R4 and M1–SR–R4 which are opened if either of these starting relays for M1 is energized.

The time delay relays TD–SR or TD–LR will be energized only if both of the vernier limit switches VS–S and VS–L are operated, as will be the case when the cam 120 (FIG. 2) turns sufficiently for both switch followers to be clear of the central notch and both riding on one of the side lobes. To provide for operation of the time delay relays there are relay contact switches R3–2 and R2–4 in the line to TD–LR and relay contact switches LR–4 and R1–3 in the line to TD–SR.

In addition, each time delay relay has its own cut-out switch, TD–SR1 for TD–SR and TD–LR1 for TD–LR which is opened as soon as the relay is energized and is not closed again until the relay core returns, say in a time for about ⅜" or ½" change in board length as controlled by the gross drive motor M1.

The time delay relay TD–SR has a normally open contact switch TD–SR2 for energizing the jog starter relay M1–SJ–R; and the time delay relay TD–LR has a normally open contact switch TD–LR2 for energizing the jog starter relay M1–LJ–R of the motor M1. Both switches are held closed for the length of the off-delay time of the time delay relay and are then opened.

In operation, the gross adjusting motor M1 is run at fast speed using M1–SR–R or M1–LR–R having normally closed contacts M1–SR–R2 or M1–LR–R2, in series with the computer short CS–S or computer long CL–S contacts. These normally closed contacts, when opened, take CS–S and CL–S out of the circuit, thus inhibiting incremental vernier adjustments during gross adjustments through M1 run circuit. At the same time, the normally open contacts M1–SR–R3 or M1–LR–R3 in parallel with each other, will close and complete the proper circuit to M2–SR or M2–LR, causing M2 to return cam 120 to the neutral or zero position, if it is off center. The direction of M2 is dictated by whichever contacts R2–2 or LR–3 is closed.

The position of cam 120 on VS-L or VS-S of course dictates which contact R2-2 or LR-3 is closed.

The function of S3 is to prevent automatic incremental correction near the end of an order, should the operator desire to reset the next desired sheet length on switches 98.

In operation QS is positioned, switch S3 is turned off, while switches 98 are reset, the RUN button in series with S4 is depressed, then S3 is instantly turned back on. M2 automatically centers cam 120, M1 runs until QS is tripped stopping the main Reeves shifter within ±½″ of desired length, M2 adjusts the vernier to the exact length within desired tolerance.

With the monitor-vernier circuit re-connected at S3, if the monitor at the end of a measured sheet, closes either CL-S or CL-L the vernier motor M2 will run to shorten or lengthen, respectively, until the switch opens by the time delay mechanism provided.

Operation of the vernier motor M2 will cause either VS-S or VS-L to be shifted to its other contact. If VS-L is shifted it will energize latch solenoid LR and relay R3. Energization of latch relay LR will mechanically operate all of its switch contacts so that they remain operated until VS-L swings back to its normal contact. Thus, LR-1 is opened so relay R2 cannot be energized; LR-2 is opened so that M2-SR, to run M2 for shortening, cannot be run unless R1-2 remains closed; LR-3 is closed so that M2-LR can be energized if one of the Reeves limit switches M1-LR-R3 or M1-SR-R3 is closed; and LR-4 is closed so that TD-SR can be energized if R1-3 is closed.

Energization of R3 causes its switch R3-1 to open so that M2-LR can be energized only through R2-3; and causes R3-2 to close so that TD-LR will be energized if R2-4 is closed.

Further adjustments in the same direction do not change the situation until the full range is used up, in which case VS-S will be shifted to its other contact. If there is reverse movement caused by action of CS-S the parts may be returned toward zero. If zero is reached LR-C will be operated to release the latch LR (which will have been de-energized) to return all parts to the original or neutral condition.

Supposing, however, that further adjustments in the same direction are made until VS-S is shifted. This will energize R1, but not R2 because LR-1 is being held open to R2. Energization of R1 will open R1-1 to cut off current from LR, R3 and LR-C. All latch switches will hold their positions because the latch release LR-C cannot be energized. The de-energization of R3 will cause R3-1 to close and R3-2 to open. Energization of R1 will also open R1-2 and leave M2-SR so it cannot be operated to shorten again. It will close R1-3 to TDS-R, and since LR-4 is closed, the relay TD-SR will be energized.

Energization of TD-SR will close TD-SR2 to cause M1 to operate until TD-SR times it out. TD-SR immediately cuts itself out of circuit at TD-SR1 but since it requires a predetermined time to return, it will keep the motor M1 running for that length of time.

When M1-SR-R is energized it will open M1-SR-R2 to cut out monitor control-delay switches CS-S and CL-S and close M1-SR-R3 to cause M2-LR to be energized (LR-3 and R3-1 being closed) until the motor M2 turns the vernier adjusting segment back to zero. When both switches VS-L and VS-S are thereby shifted back to their neutral contacts, R1 will be de-energized and the latch release LR-C energized to stop operation of the motor M1.

The above description of operations when VS-L is shifted before VS-S shows the selectivity of the system to priority of closure of these switches; also how the gross adjustment motor M1 is caused to operate and the vernier mechanism returned to zero when the vernier mechanism reaches the limit of its action in one direction.

When VS-S is shifted before VS-L is shifted the relay R2 will be energized to open R2-1 to cut out the latch relay LR; also R1 will close R1-1 to allow R3 to be energized when VS-L is shifted. It will be seen that R2-4 will be kept closed and when R3-2 is closed the time delay TD-LR will be energized to energize M1-LJ-R (at TD-LR2) of motor M1 which will run until TD-LR is de-energized and TD-LR1 opens.

It will also be seen that if current fails at any time the parts will retain their directional selectivity when current is restored, largely due to the action of the latching relay LR. The switch S3 is located where it will cut out the vernier adjusting mechanism and its time delay relays without affecting the relays R1, R2, R3, LR or LR-C.

It is thus seen that the invention provides improved means for adjusting the cut-off length of web material, such as boards, from a continuously advancing sheet or web of material by rotary cutting means; and particularly that it provides improved means for making length adjustments and maintaining an adjusted length by Reeves drive mechanism.

While certain embodiments of the invention have been described for purposes of illustration, it is to be understood that there may be various embodiments and modifications within the general scope of the invention.

We claim:

1. Apparatus for adjusting the speed output of a Reeves type transmission drive unit having conjoined and split pulley parts; comprising in combination: oppositely disposed levers for shifting the split pulley parts for varying the drive ratio of the drive unit, nut members having pivot connections with said levers, a main adjusting screw shaft having opposite thread connections with said nut members, said pivot connections each including a main pivot pin turnably mounted on said nut member and an eccentric pivot pin connected with a lever, and means for rotating said eccentric pivot pins independently of movement of said nut member to make fine or vernier adjustments in the levers, while said main pivot pins are retained by said nut member against axial movement.

2. Apparatus as set forth in claim 1, wherein said means for rotating said eccentric pivot pins comprises, a turning gear segment on said eccentric pivot pin for each lever, and means for turning said gear segments by increments from a neutral zero position for making vernier adjustments.

3. Apparatus as set forth in claim 2, in which said turning means comprises a power drive device, and means set into action when said power drive device is energized for de-energizating the drive when a predetermined vernier adjustment has been made.

4. Apparatus as set forth in claim 2, in which said turning means comprises a drive motor, a cam driven by said motor, and motor stop means operated by said cam for stopping said motor when a predetermined vernier adjustment has been made.

5. Apparatus as set forth in claim 1, which further comprises, control means for setting said rotating means into action for turning said eccentric pins from a neutral position in the required direction when a vernier adjustment is required, and means for stopping the action of said rotating means when said eccentric pin has been turned a predetermined distance in either direction from the neutral position.

6. Apparatus as set forth in claim 5, in which stopping means comprises a cam carried by an eccentric pin, and power stop control means operated by said cam.

7. Apparatus for adjusting the speed output of a Reeves type transmission drive unit having conjoined and split cone disc pulley parts, said pulley parts carrying a drive belt, comprising in combination: opposite levers connected to said cone disk pulley parts, said levers operable to shift the pulley parts axially to change the speed of the drive unit, oppositely threaded nut members pivoted to said levers for adjusting them, a gross adjusting screw shaft having oppositely threaded portions threaded in said nut members to move said nut members for making adjustments in said levers, a gross adjusting motor connected to said gross adjusting shaft for driving it, the pivot connection of each of said nut members comprising a main pivot pin turnable in a bearing in said nut member, and an integral eccentric pivot pin turnable in a block slidable in a slot in said lever, a worm gear sector secured to each of said eccentric pins and having opposite gear threads, extensions carried by said nut members, a vernier adjustment worm screw shaft turnably mounted in bearings and held against axial movement on said extensions, said vernier adjustment shaft having oppositely threaded worms meshing with the threads of said gear sectors, and a vernier adjusting motor means connected to said vernier adjusting shaft to drive it.

8. Apparatus as set forth in claim 7, which further includes, a notched cam driven by said vernier adjustment motor, and a stop switch operated by said notched cam for stopping the motor after it has made an incremental adjustment.

9. Apparatus as set forth in claim 7, which further includes, a symmetrical cam carried by one of said eccentric pins, said cam having a neutral slot and an arcuate lobe on each side thereof of predetermined limiting arcuate length, and limit switches mounted for operation by said cam, one for each direction of turning, which are arranged to stop said vernier motor when the eccentric pin has been turned by the predetermined distance from said neutral position.

10. Apparatus as set forth in claim 9, which further includes, a notched cam operated by said vernier motor, and a stop switch operated by said notched cam for stopping the motor after it has made an incremental adjustment.

11. Apparatus as set forth in claim 9, which further includes circuit control means responsive selectively to the action of the one of said two limit switches which has been actuated by said cam to retain information as to which has been operated and for locating the central or zero position of the cam and assuring the actuation to return the parts to zero position.

12. Apparatus as set forth in claim 9, which further includes circuit control means responsive selectively to the action of the one of said two limit switches which has been actuated by said cam to retain information as to which has been operated and for locating the central or zero position of the cam and assuring the actuation to return the parts to zero position, said circuit control means including a latching relay and a latch release therefor which are responsive to the action of one of said limit switches.

References Cited by the Examiner
UNITED STATES PATENTS

| | | | |
|---|---|---|---|
| 2,241,427 | 5/41 | Shields | 74—230.17 |
| 2,389,341 | 11/45 | Behrens | 74—230.17 X |
| 2,395,599 | 2/46 | Webb et al. | 74—230.17 X |
| 2,599,430 | 6/52 | Beuerman | 83—76 |
| 2,753,722 | 7/56 | De Grave | 74—217 |
| 2,827,795 | 3/58 | Caballeros | 74—217 |
| 2,940,332 | 6/60 | Teague | 74—479 X |
| 3,029,675 | 4/62 | Alexander et al. | 83—76 |
| 3,101,821 | 8/63 | Henry | 74—479 X |
| 3,153,946 | 10/64 | Allen | 74—479 |

DON A. WAITE, *Primary Examiner.*

ANDREW R. JUHASZ, *Examiner.*